United States Patent
Gaborski

Patent Number: 5,943,435
Date of Patent: Aug. 24, 1999

[54] BODY PART RECOGNITION IN RADIOGRAPHIC IMAGES

[75] Inventor: Roger S. Gaborski, Pittsford, N.Y.

[73] Assignee: Eastman Kodak Company, Rochester, N.Y.

[21] Appl. No.: 08/946,150

[22] Filed: Oct. 7, 1997

[51] Int. Cl.$^6$ .................................................. G06K 9/00
[52] U.S. Cl. ................................... 382/132; 382/228
[58] Field of Search .................................... 382/128, 132, 382/190, 195, 228; 128/922

[56] References Cited

U.S. PATENT DOCUMENTS

| | | | |
|---|---|---|---|
| 4,881,270 | 11/1989 | Knecht et al. | 382/17 |
| 4,903,310 | 2/1990 | Takeo et al. | 382/6 |
| 4,944,023 | 7/1990 | Imao et al. | 382/37 |
| 4,951,201 | 8/1990 | Takeo et al. | 364/413.13 |
| 5,164,993 | 11/1992 | Capozzi et al. | 382/6 |
| 5,263,098 | 11/1993 | Horikami | 382/48 |
| 5,345,513 | 9/1994 | Takeda et al. | 382/6 |
| 5,353,132 | 10/1994 | Katsuma | 358/539 |
| 5,465,308 | 11/1995 | Hutcheson et al. | 382/159 |
| 5,533,143 | 7/1996 | Takeo | 382/132 |
| 5,579,471 | 11/1996 | Barber et al. | 395/326 |

OTHER PUBLICATIONS

Shih-Fu Chang et al., "Extracting Multi-Dimensional Signal Features for Content-Based Visual Query," *SPIE Symposium on Visual Communications and Signal Processing*, May 1995, pp. 1-12.

Yossi Rubner et al., "Navigating through a Space of Color Images," World Wide Web, Stanford University. (No Date).

*Primary Examiner*—Andrew W. Johns
*Attorney, Agent, or Firm*—William F. Noval

[57] ABSTRACT

The body part classification of a radiographic image is a key component of systems that produce an optimal tone scale curve for either hard copy or soft copy presentation. A method automatically determines the body part class based on a subset of relevant features and a probabilistic reasoning unit (PRU). The reasoning unit estimates the most probable body part class based on probabilistic information that associates a given class with the joint probability of the detection of a subset of features and their spatial relationships.

5 Claims, 3 Drawing Sheets

BODY PART RECOGNITION IN RADIOGRAPHIC IMAGES

FIELD OF THE INVENTION

This invention relates in general to digital image processing, and more specifically, to a method for recognizing the body part contained in a digital radiographic image.

BACKGROUND OF THE INVENTION

In medical imaging, in order to render the optimal hard copy or soft copy image, common practice is to develop a tone scale curve that is customized to the particular body part. Furthermore, common practice is to have the user input the body part type. An example of this approach is Capozzi and Schaetzing, U.S. Pat. No. 5,164,993, issued Nov. 17, 1992, entitled Method and Apparatus for Automatic Tonescale Generation in Digital Radiographic Images. It is desirable to eliminate the need to manually specify the body part by automatically recognizing the body part class that is to be rendered.

A common approach to object recognition is based on collecting a set of features and comparing these features with feature vectors of target classes. Knecht and Chenoweth, U.S. Pat. No. 4,881,270, issued Nov. 14, 1989, apply this approach to naval ship detection utilizing Fourier transform coefficients. Hutcheson, Or, et al, U.S. Pat. No. 5,465,308, issued Nov. 7, 1995, utilizes a neural network to recognize a two dimensional image which is similar to an image stored in a database. The images are processed to obtain the images power spectrum and the coefficients are used as the features. Kaoru and Watanabe, U.S. Pat. No. 4,944,023, issued Jul. 24, 1990, describe a method of object recognition based on describing the image as a set of regions in a n-dimensional space defined by a tree structure.

Horimaki, U.S. Pat. No. 5,263,098, issued Nov. 16, 1993, bases his approach on the comparison of a gray level histogram formed from the unknown image and compares this histogram with histograms of known objects in an attempt to match unknown objects with known objects.

Katsuma, U.S. Pat. No. 5,353,132, issued Oct. 4, 1994, relies on the distribution of color information in an image represented by a color histogram for matching.

Barber, Beital, et al, U.S. Pat. No. 5,579,471, issued Nov. 26, 1996, describe a method to search a database in response to a user's queries. The system uses general features, including color, of an image in an attempt to find similar looking images.

The methods described by Knecht and Chenoweth, Hutcheson and Or and Daoru and Watanabe do not directly use any information regarding the spatial relationship between features, or the probability of how likely it is that these features will be detected in the unknown image. The method disclosed by Horikami is sensitive to scale and occlusion of the objects. Katsuma's method relies on color histograms and would not be applicable to gray level radiographic images. The purpose of Barber, Beital, et al., is to retrieve images from an image database. This approach is related to content sensitive image database searching (Chang, S. F. and Smith, J. R., "Extracting Multi-Dimensional Signal Features for Content-Based Visual Query," SPIE Symposium on Visual Communications and Signal Processing, May, 1995). The purpose of these systems is to locate in a large image database images that are similar to an example image, sketch or keyword text input provided by the user. These systems typically depend on global color representation using color histograms and texture (Rubner, Y., Guibas, L., and Tomasi, C., "Navigating Through a Space of Color Images," World Wide Web, Stanford University). Color representation is a key component of these systems. Since the color histograms lack spatial cues, coarse segmentation based on color is sometimes used.

All of these methods either generate a feature vector or histogram and attempt to find the best match in a known database. None of the methods use a probabilistic model founded on anatomical information, nor is the final decision based on the probabilistic evidence resulting from the subset of features that were detected.

SUMMARY OF THE INVENTION

According to the present invention, there is provided a solution to the problems of the prior art.

According to a feature of the present invention, there is provided a method for automatically recognizing the body part class (lateral c-spine, AP chest, lateral chest, etc.) contained in a radiographic image. The system uses a set of features (or a subset of those features) combined with a probabilistic reasoning unit implemented using a Bayesian network to identify, in a maximum probabilistic sense, the most probable body part.

ADVANTAGEOUS EFFECT OF THE INVENTION

The invention disclosed here matches an unknown image to a body part class (for example, lateral c-spine, AP chest, lateral chest, etc.) in a database. The purpose is to recognize the class the image belongs to, not find images that look similar under some metric. This invention segments the unknown image into primitive objects, such as edges, curves, complex analytic functions, texture measure, etc. and groups these objects together to describe the overall spatial layout of image. The invention is a robust automatic body part recognition method that is applicable to both storage phosphor based radiographic system as well as direct digital radiographic systems. The method of the invention eliminates the need for a user to manually insert body part information into the system.

DETAILED DESCRIPTION OF THE INVENTION

Figure 4:
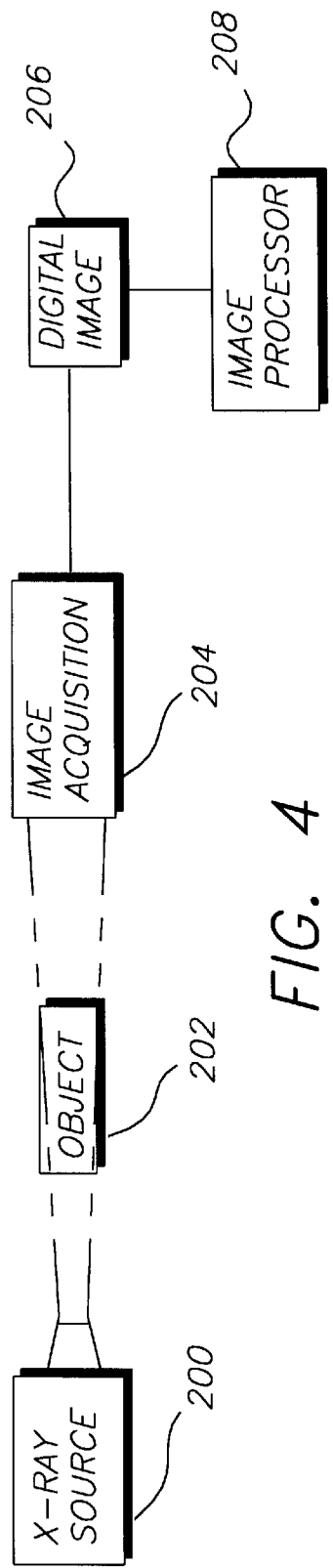
FIG. 4 is a block diagram of a digital radiographic image acquisition system.

The method of the present invention is described as a series of operations performed on a digital radiographic image of a body part. The digital image can be formed by the digital image acquisition system of FIG. 4. As shown, x-ray source 200 projects x-rays through object 202 (such as a body part extremity, e.g., hand or foot) to image acquisition system 204. The image acquisition system can be, for example, (1) a standard x-ray screen/film combination which produces an x-ray film image which is processed chemically or thermally and the processed film digitized by a scanner/digitizer 206; (2) a computed radiography system where a latent x-ray image is formed in a storage phosphor 204 and a corresponding digital image is produced by reading out the storage phosphor by a CR reader 206; (3) a diagnostic scanner (such as MRI, CT, US, PET) produces an electronic x-ray image which is digitized; and (4) a direct digital acquisition system typically consisting of a phosphor based scintillating screen coupled to an imager (CCD, MOS) through a lens or fiber optic system.

Figure 5:
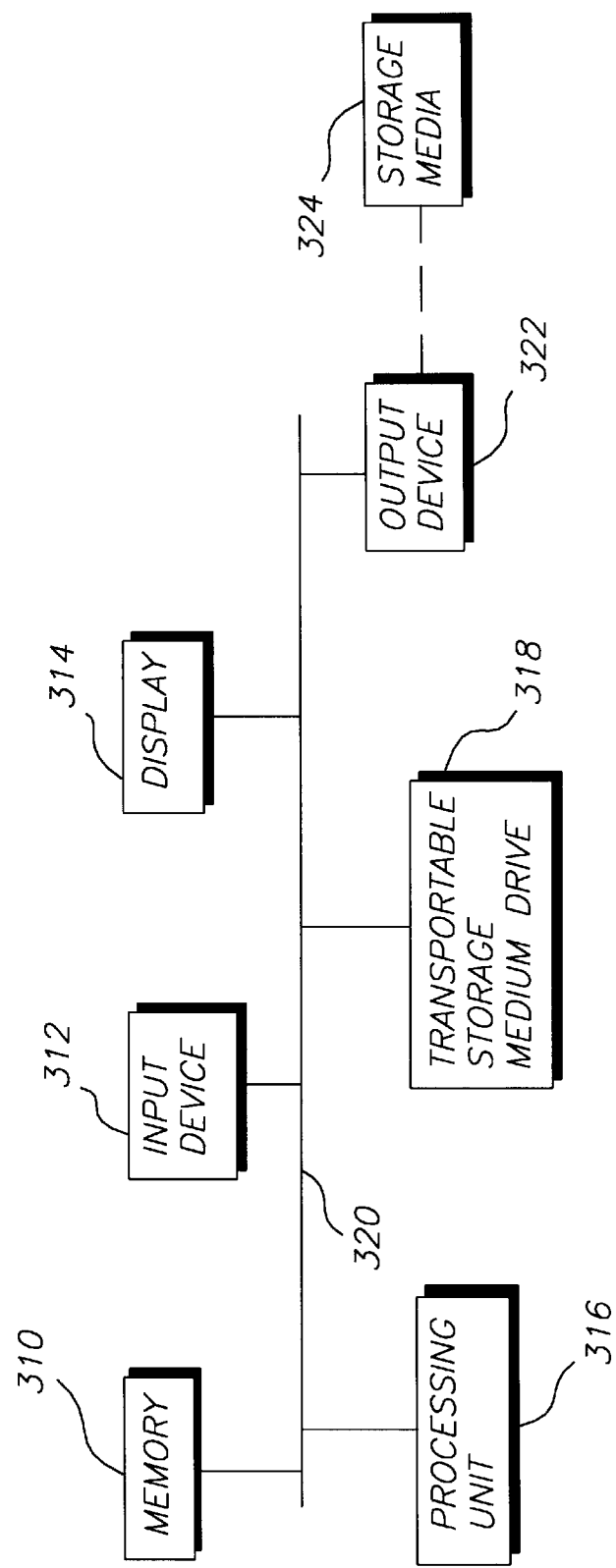
FIG. 5 is a block diagram of a digital image processor for carrying out the method of the present invention.

The digital image is processed in image processor 208, according to the method of the present invention. Image processor 208 can take the form of a digital computer, such as illustrated in FIG. 5. In such case, one or more of the steps of said method can be carried out using software routines. Image processor 208 can also include hardware or firmware for carrying out one or more of said method steps. Thus, the steps of the method of the invention can be carried out using software, firmware, and hardware, either alone or in any preferable combination.

As shown in FIG. 5, a digital computer 300 includes a memory 310 for storing digital images, application programs, operating system, etc. Memory 310 can include mass memory (such as a hard magnetic disc or CD ROM), and fast memory (such as RAM). Computer 30 also includes input device 312 (such as a keyboard, mouse, touch screen), display 314 (CRT monitor, LCD), central processing unit 316 (microprocessor), output device 318 (thermal printer, dot matrix printer, laser printer, ink jet printer). Components 310,312,314,316,318 are connected together by control/data bus 320. Computer 300 can include a transportable storage medium drive 322 for reading from and/or writing to transportable storage media 324, such as a floppy magnetic disk or writeable optical compact disk (CD).

As used in this application, computer readable storage medium can include, specifically, memory 310 and transportable storage medium 324. More generally, computer storage medium may comprise, for example, magnetic storage media, such as magnetic disk (hard drive, floppy disk) or magnetic tape; optical storage media, such as optical disk, optical tape, or machine readable bar code; solid state electronic storage devices, such as random access memory (RAM), read only memory (ROM); or any other physical device or medium which can be employed to store a computer program.

Figure 1:
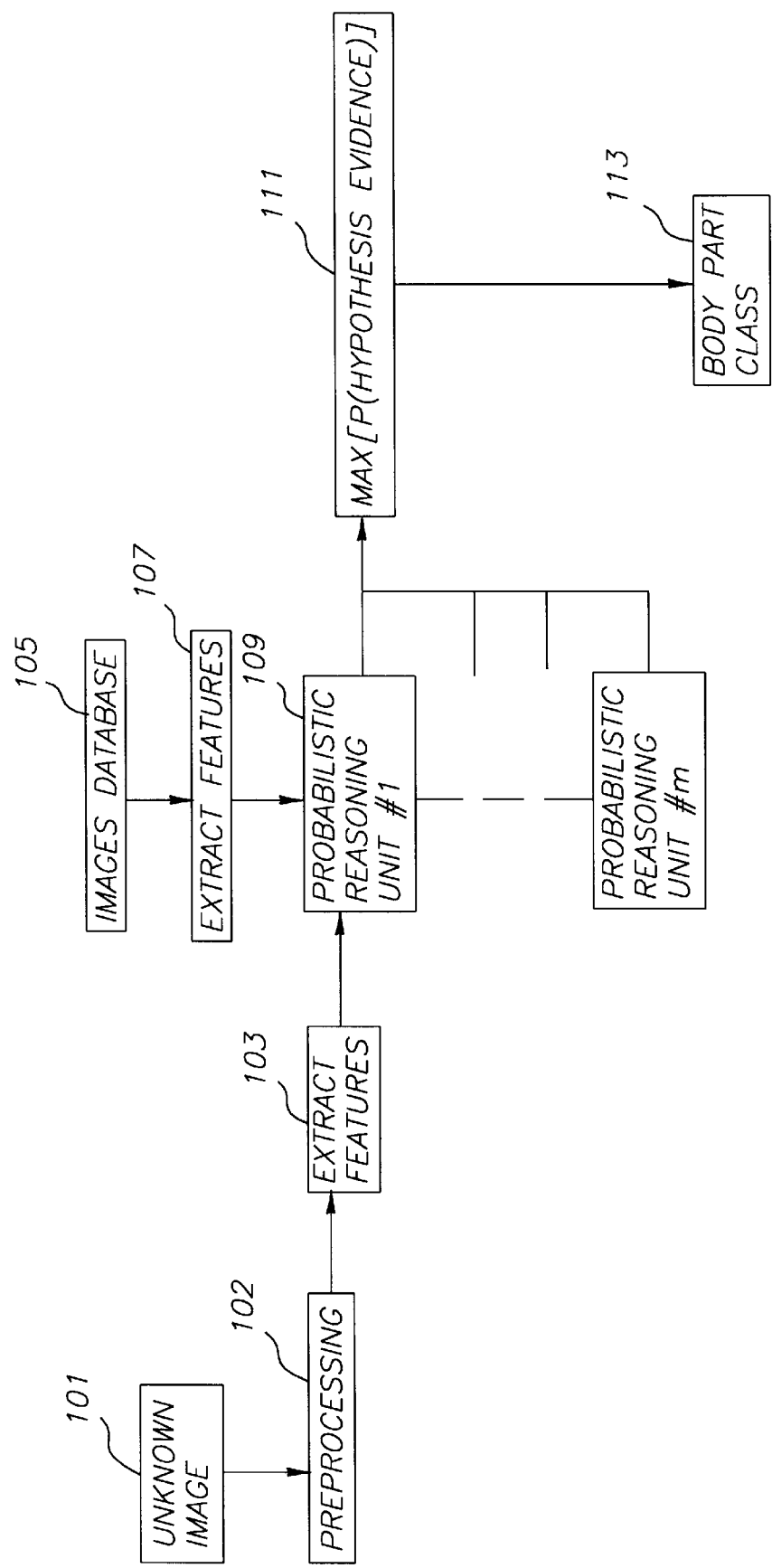
FIG. 1 is a body part recognition system block diagram according to the invention.

FIG. 1 is a block diagram of the body part recognition method of the present invention. Box 101 is the gray level digital radiographic image which is to be classified as to body part class by the method. The unknown digital radiographic image is segmented to separate the body part from the foreground and background in Box 102. Edge enhancement and noise removal algorithms are also applied as a preprocessing step before the extraction of features. Boxes 103 and 107 extract the same set of features, the difference being that box 103 extracts the features from the unknown image, whereas Box 107 extracts the features from the set of images that compose the Image Database (Box 105) (e.g., FIG. 5, memory 310). Image Database (Box 105) contains representative samples of the image types that the system is designed to identify. This would include a wide range of body part classes and projections. The features extracted may include both low level features, such as gray level values, edges, simple curves, complex curves, textures, etc., and higher level features, such as bone regions, tissue regions, bone geometry, and hypothesized bone and tissue objects (femur bone, lung region, etc.). The method described does not limit the features to the ones listed. Any feature can be included that is relevant, that is, will help discriminate one body part class from another.

Box 109 is the Probabilistic Reasoning Unit (PRU). A single PRU may contain the information for all possible body part classes in the image database, or individual PRU can be implemented for each body part class as illustrated in FIG. 1. In this case, a subclass of features is chosen that best represents that body part class. For example, the chest image class may include a texture measure for lung tissue and a detector for vertebra, whereas the PRU for the PA hand body class would not. A conditional probability for each class of body part and features is estimated based on the data in the Image Database (Box 105). The probabilities are conditioned not only on if a feature is present, but also on it's spatial location, i.e., P(class A|feature #k present in specified location).

Figure 2:
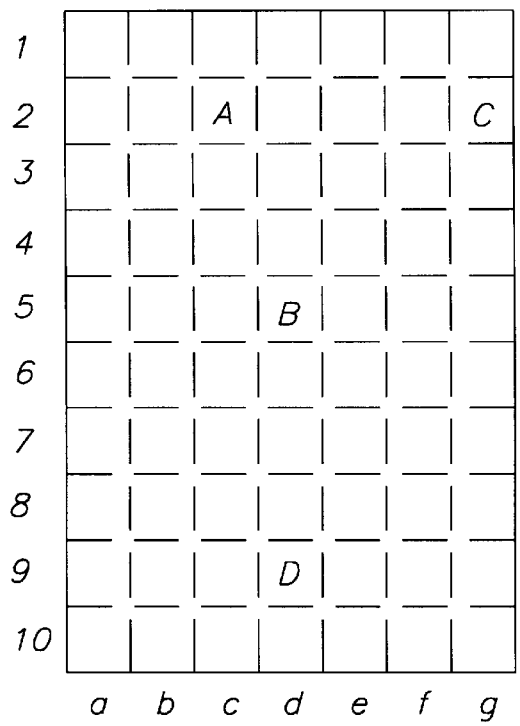
FIG. 2 is a graphical view showing two methods for describing the location of features.

The result is each body part class is described by a set of features and a description of the spatial relationship between the features. The spatial relationships could be implemented using spatial descriptions such as, to the left of, above, below, to the right of and combinations of such descriptors, i.e., to the right of and below. Another method would be comprised of normalizing the images to a standard size and then projecting a grid. In this approach, the features would be located using a grid coordinate system, and the spatial relationships between the features would be inherent in the grid position description. As shown in FIG. 2, Features A, B, C, and D can be located using the descriptors A is to the left of C, A and C are both above B, and B is above D. Another method to capture the spatial relationships between the features is to use the grid locations, i.e., Feature A is located at (2,C), B is located at (5,d), etc.

Figure 3:
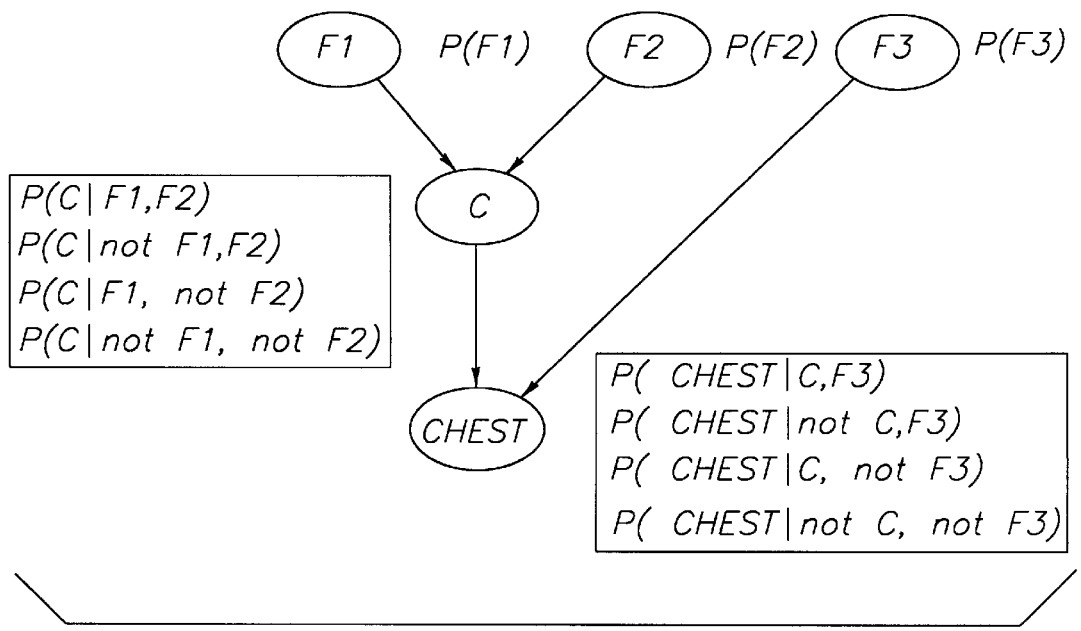
FIG. 3 is a diagrammatic view of a method to implement a probabilistic reasoning unit.

In a Bayesian Network implementation of a probabilistic reasoning unit, each feature is represented by a node in a directed graph. The directed links between the nodes indicates the causal relationships between the nodes. The conditional probabilities assigned to these links are determined from the training data. For example, P(chest=k|feature #1 is present in specified location) is the probability that the image is a chest given that feature #1 is true. P(chest=k|feature #1 is not present in specified location) which is the probability that the image is a chest given that feature #1 is false. In FIG. 3, the probability that the image is a chest is conditioned on the joint probability of C and F3.

When an unknown image is processed by the feature extraction algorithms (FIG. 1, Box 103) it is highly unlikely that all the features will be detected. It is now necessary to calculate the probability of the image being a member of class A given that only a subset of features were detected. For example:

P(class A | Feature #1 present in specified location, Feature #2 not present, Feature #3 not present, . . . , Feature #k present in specified location).

This conditional joint probability is determined by a Bayesian Network which has the ability to process uncertainties of this type and produce the hypothesis as to which is the most likely body part (J. Pearl, "Probabilistic Reasoning in Intelligent System," Morgan-Kaufmann, 1988, and F. Jensen, "An Introduction to Bayesian Networks," Springer-Verlag, 1996).

The likelihood for each body part is updated when a feature is or is not detected. A given set of features will result in a set of probable hypothesis which is the maximum of the probabilities of each hypothesis given the evidence found (FIG. 1, Box 111) is chosen (FIG. 1, Box 113, Body Part Class). For example, if lung tissue is detected in a lateral c-spine image, this feature would provide some evidence for a chest image. But the remaining feature evidence would not support this possibility and the correct c-spine class would be identified.

The invention has been described in detail with particular reference to certain preferred embodiments thereof, but it will be understood that variations and modifications can be effected within the spirit and scope of the invention.

PARTS LIST 101 gray level digital radiographic image
102 preprocessing
103 extract features
105 image database
107 extract features
109 probabilistic reasoning unit (PRU)
111 max{P(hypothesis|evidence)}
113 body part class
200 x-ray source
202 object
204 image acquisition system
206 scanner/digitizer
208 image processor
310 memory
312 input device
314 display
316 central processing unit
318 output device
320 control/data bus
322 transportable storage medium drive

What is claimed is:

1. A method for automatically recognizing a body part in a digital radiographic image comprising the steps of:

providing a digital radiographic image having a body part to be recognized;

preprocessing said digital radiographic image with segmentation, noise removal, and edge enhancement techniques;

extracting features from said preprocessed image;

providing an image database of a set of representative samples of image types that are to be identified;

extracting features from the image type set provided in said image database;

using a probabilistic reasoning unit, comparing the features extracted from said preprocessed image with the features extracted from said image database to produce a set of probable body parts with varying degrees of confidence; and choosing the body part having the maximum degree of probabilities as the body part class for the provided digital radiographic image.

2. The method of claim 1 wherein said step of using a probabilistic reasoning unit includes the step of defining the feature's spatial relationships using either spatial descriptors or a grid system.

3. The method of claim 1 wherein said step of using a probabilistic reasoning unit includes the step of using a probabilistic reasoning net.

4. The method of claim 3 wherein said probabilistic reasoning net is a Bayesian Network.

5. A computer storage product comprising:

a computer readable storage medium having a computer program stored thereon for performing a method for automatically recognizing a body part in a digital radiographic image comprising the steps of:

providing a digital radiographic image having a body part to be recognized;

preprocessing said digital radiographic image with segmentation, noise removal, and edge enhancement techniques;

extracting features from said preprocessed image;

providing an image database of a set of representative samples of image types that are to be identified;

extracting features from the image type set provided in said image database;

using a probabilistic reasoning unit, comparing the features extracted from said preprocessed image with the features extracted from said image database to produce a set of probable body parts with varying degrees of confidence; and choosing the body part having the maximum degree of probabilities as the body part class for the provided digital radiographic image.

* * * * *